(12) United States Patent
Zhai

(10) Patent No.: US 7,756,019 B2
(45) Date of Patent: Jul. 13, 2010

(54) METHOD AND DEVICES FOR IMPLEMENTING GROUP PROTECTION IN MPLS NETWORK

(75) Inventor: Suping Zhai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 825 days.

(21) Appl. No.: 11/561,116

(22) Filed: Nov. 17, 2006

(65) Prior Publication Data

US 2007/0159961 A1 Jul. 12, 2007

(51) Int. Cl.
H04L 12/28 (2006.01)

(52) U.S. Cl. ...................................... 370/228

(58) Field of Classification Search ................ 370/216, 370/228, 227, 225, 238, 256, 237, 223, 220, 370/242, 244, 247, 248, 250, 251, 226, 218; 709/239, 238
See application file for complete search history.

(56) References Cited

U.S. PATENT DOCUMENTS

| | | | | |
|---|---|---|---|---|
| 6,901,048 | B1 * | 5/2005 | Wang et al. | 370/228 |
| 7,043,250 | B1 * | 5/2006 | DeMartino | 455/445 |
| 7,092,361 | B2 * | 8/2006 | Puppa et al. | 370/242 |
| 7,443,843 | B2 * | 10/2008 | Matsuo et al. | 370/386 |
| 7,480,283 | B1 * | 1/2009 | Sylvain | 370/352 |
| 2003/0063560 | A1 | 4/2003 | Yau-ren et al. | 370/216 |
| 2005/0083928 | A1 | 4/2005 | Sivabalan et al. | 370/389 |

FOREIGN PATENT DOCUMENTS

| | | |
|---|---|---|
| CN | 1588890 | 3/2005 |
| CN | 1618025 | 5/2005 |
| KR | 2005-0047667 | 5/2005 |
| WO | WO 2005/109013 | 11/2005 |

OTHER PUBLICATIONS

CCAMP GMPLS P&R Design Team, "Analysis of Generalized Multi-Protocol Label Switching (GMPLS)—Based Recovery Mechanisms (Including Protection and Restoration)," IETF Standard-Working-Draft, Internet Engineering Task Force (2005).
CCAMP GMPLS P&R Design Team, "Recovery (Protection and Restoration) Terminology for Generalized Multi-Protocol Label Switching (GMPLS)," IETF Standard-Working-Draft, Internet Engineering Task Force (2005).
Sharma et al., "Framework for Multi-Protocol Label Switching (MPLS)-Based Recovery," IETF Standard, Internet Engineering Task Force (2003).
International Search Report for International Application No. PCT/CN2005/002888, dated Feb. 8, 2007.

* cited by examiner

Primary Examiner—Chi H Pham
Assistant Examiner—Alexander Boakye

(57) ABSTRACT

A method for implementing group protection in a Multiple Protocol Label Switching (MPLS) network disclosed in the present invention includes: monitoring a Label Switched Path (LSP) in an MPLS network; and performing a group protection switching when a failure is determined on an LSP of the working LSP group according to a monitoring result. In the present invention, a state of each monitored LSP of the working LSP group and the protection LSP group is monitored without merging LSPs of each LSP group. Moreover, as long a Signal Fail (SF) or a Signal Degrade (SD) is detected on an LSP of the working LSP group and no SF/SD is detected in the protection LSP group, an LSP group protection switching will be triggered, thereby easy the implementation of the LSP group protection.

25 Claims, 5 Drawing Sheets

METHOD AND DEVICES FOR IMPLEMENTING GROUP PROTECTION IN MPLS NETWORK

CROSS-REFERENCE TO RELATED APPLICATION

This application claims the benefit of Chinese Patent Application No. 200510114859.6, which was filed on Nov. 17, 2005, the entire disclosure of which is hereby incorporated herein by reference.

BACKGROUND OF THE DISCLOSURE

1. Field of the Invention

The present invention relates to the Multiprotocol Label Switching (MPLS) technology, and more particularly, to a method and devices for implementing group protection in an MPLS network.

2. Background of the Invention

The Label Switched Path (LSP) unidirectional protection technique is a mature protection technique in MPLS networks, and includes such types of protection as 1+1 type, 1:1 shared mesh type and packet 1+1 type. All of these types are trail-based protection types.

Along with the continuous development of the protection switching of MPLS networks, an LSP bidirectional protection switching, an Automatic Protection Switching (APS) protocol and an MPLS SubNetwork Connection Protection (SNCP) technique are further provided based on the existing trail-based LSP unidirectional protection switching. The MPLS SNCP includes the SNCP with Sublayer monitoring (SNC/S) technique, the Non-intrusively monitored SNCP (SNC/N) technique and the Inherently monitored SNCP (SNC/I) technique. The MPLS SNCP technique protects some parts of the LSP, and is applicable to segment-protection of inter-domain LSPs. A working LSP may be a part of an LSP connection in a sub-network, or may be the whole LSP connection in a sub-network.

The SNC/S divides the LSP into multiple nested sublayers, and there is independent MPLS Operation and Maintenance (OAM) information in each sublayer to monitor survivability of the LSP in the sublayer. The state of a sublayer LSP is monitored by the MPLS OAM, and APS information is transmitted in the SNC. The SNC/S can be used in a bidirectional/unidirectional 1+1 protection or a bidirectional/unidirectional 1:1 protection.

The SNC/N is applicable to protection switching based on Non-intrusively monitoring in the LSP sub-network. The SNC/N may include two modes: an end-to-end mode and a sublayer mode. The former serves for protection switching of end-to-end LSP in the LSP sub-network, and the latter serves for protection switching of segment LSP in the sub-network. The SNC/N is preferably used in a unidirectional 1+1 protection and needs no transmission of APS protocol information.

The SNC/I technique is applicable to applications in which the MPLS functions as a client and performs protection switching based on trail monitoring information of a server layer. In this case, a Server/MPLS adaptation layer transmits a Server Signal Degrade (SSD)/Server Signal Fail (SSF) of the server layer to the MPLS layer as a triggering signal of the LSP protection switching, and the APS is transmitted in the SNC. The SNC/I can be used in a bidirectional/unidirectional 1+1 protection or in a bidirectional/unidirectional 1:1 protection.

The LSP protection may include trail-based protection and SubNetwork Connection (SNC) protection according to protection objects. The trail-based protections may further include individual trail protections and group trail protections, the SNC protection may further include individual SNC protection and group SNC protection.

When using the trail-based LSP group protection technique in existing MPLS networks to implement the trail-based LSP group protection, operations shown in FIG. 1 may be performed. As shown in FIG. 1, when working traffic is from Network Element (NE) A to NE Z, NE A is the source and NE Z is the sink; when the working traffic is from NE Z to NE A, NE Z is the source and NE A is the sink. NE A and NE Z have selectors and bridges respectively. The bridge of the source bridges the working traffic to the working LSP (1:1 type), or to the working LSP and the protection LSP (1+1 type), and the selector of the sink receives the working traffic from the working LSP. The implementation of group protection may include following processes. All of the working LSPs are merged into one merged LSP and the protection LSPs are merged into one merged LSP. When a failure, such as, a Signal Degrade (SD) or a Signal Fail (SF), is detected on the merged LSP of the working LSPs while no SD/SF occurs on the merged LSP of protection LSPs, the LSP group protection will be triggered to switch the working traffic to the protection ISP. In the 1:1 protection, the bridge of the source switches the working traffic on the working LSP to the protection LSP, and the selector of the sink receives the working traffic from the protection LSP. In the 1+1 protection, since the working traffic is already on the protection LSP, the source needs no operations and the selector of the sink selects receiving the working traffic from the protection LSP.

In the LSP protection techniques in existing MPLS sub-networks, when LSP group protection is needed in the SNC, the LSP group protection may be realized using the SNC/N or the SNC/S technique. FIG. 2 shows a schematic diagram illustrating the operations of group protection using the SNC/S technique, and the operations of the group protection using the SNC/N technique are similar. As shown in FIG. 2, the implementation of the group protection may include following processes. All of the working LSPs are merged into one merged LSP sub-trail and the protection LSPs are merged into one merged LSP sub-trail, and the merged LSP sub-trail may be monitored through the SNC/N or the SNC/S principle. When the SD or the SF occurs on the merged LSP sub-trail of the working LSPs while no SD/SF occurs on the merged LSP sub-trail of protection LSPs, the LSP group protection will be triggered.

As described above, either for the trail-based LSP group protection or for the SNC/N or SNC/S-based LSP group protection, the solution above needs to merge trail-based working/protection LSPs or SNC-based working/protection LSPs into a merged LSP trail or a sub-trail, and to implement the trail-based LSP group protection or the LSP group protection in MPLS sub-network, by monitoring the merged LSP trail or the sub-trail. Therefore, the technical solution of implementing the group protection in MPLS networks is complicated. Furthermore, in a protection switching, all merged LSPs trail needs to be switched simultaneity, which makes it hard to meet the requirements of flexible protection switching in the protection switching, such as the requirement of protection switching for partial paths.

SUMMARY OF THE INVENTION

In accordance with preferred embodiments of the present invention, a method and devices for implementing group protection in an MPLS network are provided to simplify implementation of the group protection in an MPLS network.

In an embodiment, a method for implementing group protection in an MPLS network includes: monitoring an LSP in an MPLS network; and upon detecting a failure on an LISP of a working LSP group, performing a group protection switching according to the monitoring result.

In another embodiment of the present invention, a device for implementing group protection in an MPLS network may include an LSP monitoring module and a protection switching module. The LSP monitoring module may monitor each LSP in a working LSP group and each LSP in a protection LSP group in an MPLS network respectively, and the protection switching module may perform a protection switching operation when a failure is detected on any one of the LSPs of the working LSP group according the monitoring result of the LSP monitoring module.

In another embodiment of the present invention, a device for implementing group protection in an MPLS network may include a sink processing unit and a source processing unit.

The sink processing unit may include an LSP monitoring module to monitor each LSP or test dedicated LSP of a working LSP group and a protection LSP group in an MPLS network, and trigger a protection switching when a failure is detected in the working LSP group and the protection LSP group is normal; a first message constructing module to construct a first APS message containing a group number of the LSP group with a failure after the protection switching is triggered, and send the first APS message to the source processing unit via the protection LSP group to request the source processing unit to perform the protection switching; and a first protection switching module to instruct a selector of the sink to receive working traffic from the protection LSP group after receiving a second APS message returned by the source processing unit.

The source processing unit may include a second protection switching module to instruct a bridge of the source to switch the working traffic from the working LSP group with a failure to the protection LSP group after receiving the first APS message from the sink processing unit, and a second message constructing module to construct a second APS message containing a protection switching result according to the switching result of the second protection switching module, and send the second APS message to the sink processing unit via the protection LSP group to notify the sink processing unit of the on switching results.

In another embodiment of the present invention, a device for implementing group protection in an MPLS network may include a sink processing unit. The sink processing unit may include an LSP monitoring module and a protection switching module. The LSP monitoring module may monitor each LSP or test dedicated LSP of a working LSP group and a protection LSP group in an MPLS network, and may trigger a protection switching when a failure is detected in the working LSP group and the protection LSP group is normal, and the protection switching module may instruct a selector of the sink to receive the working traffic from the protection LSP group after the protection switching is triggered.

According to above technical solutions provided in the preferred embodiments of the present invention, each LSP of the working LSP group and the protection LSP group is monitored, and as long as an SF or an SD is detected on any one of the LSPs of the working LSP group or on a certain working LSP while no SF or SD is detected on any one of the LSPs or on some certain LSP of the protection LSP group, an LSP group protection switching may be triggered. The solution provided in the preferred embodiments of the present invention may effectively make implementation of the LSP group protection less complex.

In addition, the SNC/T based LSP group protection provided in the embodiments of the present invention is applicable to the case that additional LSPs with the same attributes as that of LSPs in the protection domain exist in the MPLS network, wherein the additional LSPs, rather than the LSP group in the protection domain, may monitor the LSPs, and an LSP group protection operation may be triggered according to monitoring results of the additional LSPs. By introducing the SNC/T, more schemes are offered for implementing the LSP group protection in the MPLS sub-network.

Also, in accordance with the preferred embodiments of the present invention, when a failure is detected on a working LSP, a protection switching operation may be performed on partial specified paths, which makes the LSP group protection in the MPLS network more flexible and convenient.

DETAILED DESCRIPTION OF THE PREFERRED EMBODIMENTS

The present invention will be described in detail hereinafter with reference to accompanying drawings and preferred embodiments.

Embodiments of the present invention provide a method for implementing simple trail-based LSP group protection or SNC-based LSP group protection to make the group protection in an MPLS network less complex.

Embodiments of the present invention also provide a scheme for implementing SNC-based LSP group, i.e., a scheme for implementing SNC/T-based group protection, which may provide more choices for the implementation of the SNC-based LSP group protection.

Embodiments of the present invention further include improvement of the existing scheme of trail-based LSP group protection or SNC-based LSP group protection, and the implementation scheme will be hereinafter described in detail.

The solution provided in preferred embodiments differs from the existing solution of trail-based LSP group protection or SNC-based LSP group protection in that, working LSPs in a working LSP group and protection LSPs in a protection LSP group are not merged any more. Each working LSP or protection LSP may be directly monitored respectively. When a failure occurs on a working LSP in the working LSP group and a protection LSP in the protection LSP group works well, a protection switching may be performed.

The trail-based LSP group protection is taken as an example hereinafter to describe in detail the solution in accordance with preferred embodiments of the present invention.

In a first embodiment of the present invention, the solution of the trail-based LSP group protection may include following steps.

First, configure group protection related parameters in the source and in the sink of the LSP group protection, such as group numbers of a working LSP group and a protection LSP group, relationships between the working LSP group and a group number as well as between the protection LSP group and a group number, and so on. The priority of the LSP group protection may be configured higher than that of an individual trail protection.

Second, monitor the survivability of an LSP by using the MPLS OAM mechanism according to a Terminal Connection Point (TCP) function of the LSP.

Figure 1:
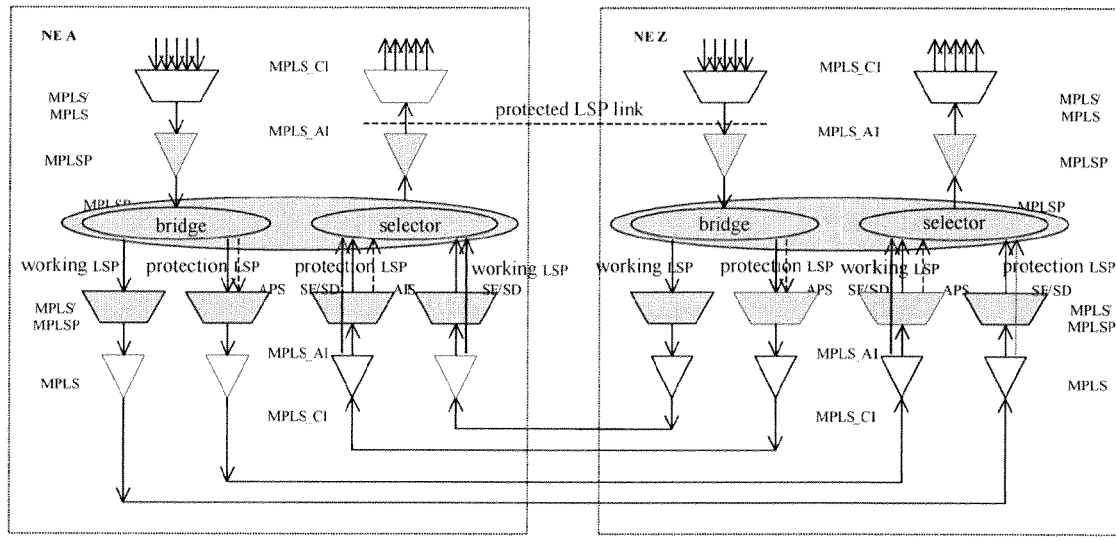
FIG. 1 is a schematic diagram illustrating a group trail protection in an MPLS network.
Figure 2:
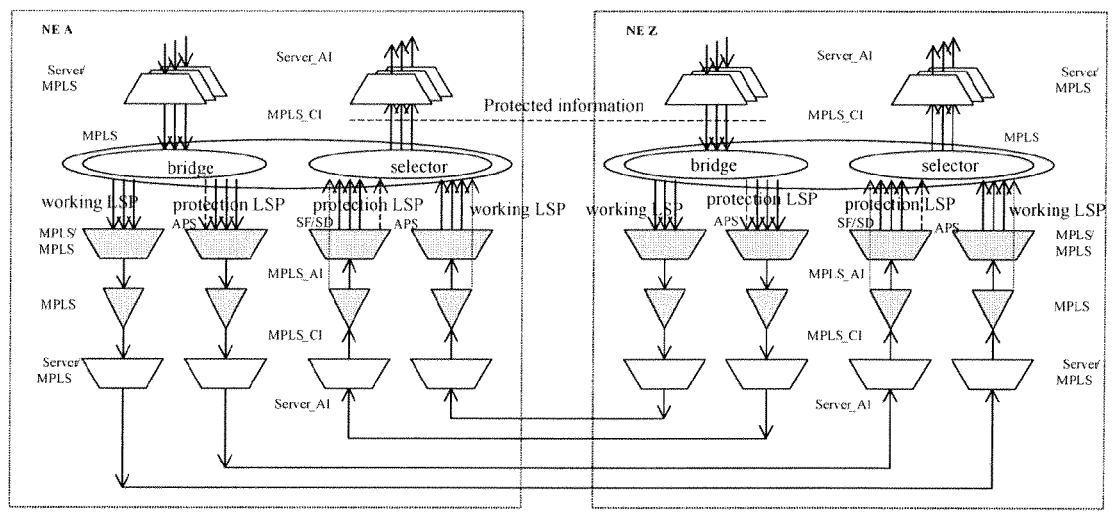
FIG. 2 is a schematic diagram illustrating an SNC/S group protection in an MPLS network.
Figure 3:
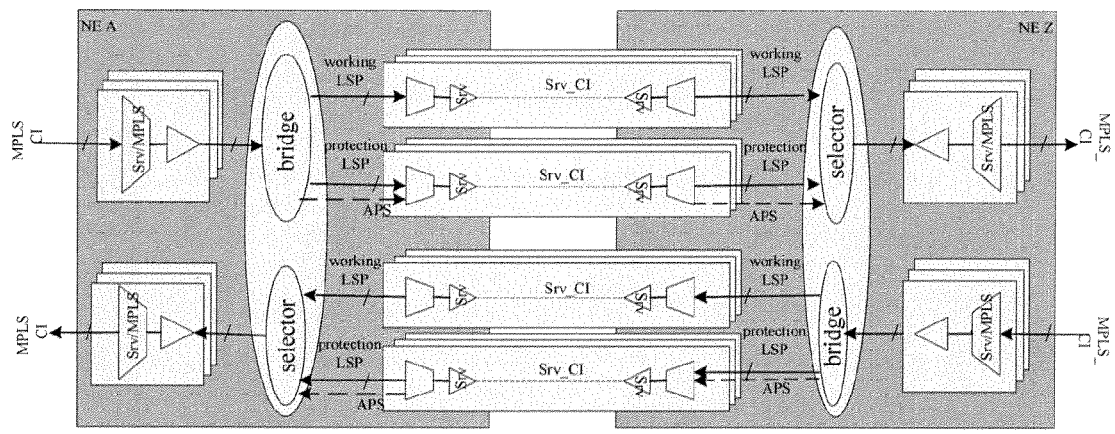
FIG. 3 is a schematic diagram illustrating the group trail protection in accordance with a first embodiment of the present invention.

FIG. 3 shows a model illustrating the trail-based LSP group protection solution. As shown in FIG. 3, NE A and NE Z may not merge the working LSPs and the protection LSPs in one LSP respectively but may monitor each working/protection LSP at the TCP of an LSP, which can use following solution, a source of the LSP may insert and send a detection packet periodically and the sink may detect the detection packet periodically.

Third, when an SD/SF occurs on an LSP of the monitored working LSP group while no SD/SF occurs on an LSP of the protection LSP group, a protection switching may be carried out according to the APS protocol, that is, the working traffic on the working LSP group may be switched to the protection LSP group.

The protection switching procedure is based on the APS protocol, thus the APS protocol should be run over the protection LSP, that is, APS messages interactions may be performed between two ends of the LSP.

In this embodiment, the APS messages provided by the APS protocol are employed, and path numbers in the Requested Signal field and the Bridged Signal field of the APS message are replaced by group numbers. The format of the APS message is shown in Table 1.

A protection switching operation may be implemented using the APS message as shown in Table 1, and the implementation may include following steps.

(1) When a failure is detected at the sink of a monitored working LSP, the sink sends a first APS message, i.e. an APS request message to the source via a protection LSP group to request the source to switch the working traffic, wherein the value in the Requested Signal field of the first APS message is equal to the group number of the working LSP group with a failure.

(2) When receiving the first APS message, the source switches the working traffic from the working LSP group with a failure to the protection LSP group according to configured group protection related parameters, and sends a second APS message, i.e an APS response message to the sink via the protection LSP group, wherein the value in the Bridged Signal field of the second APS message is equal to the group number of the working LSP group bridged to the protection LSP group.

(3) When receiving the second APS message, the sink selects the protection LSP group to obtain the working traffic from the protection LSP group according to the configured group protection related parameters. As such, the protection switching operation is implemented.

Note that the above operations are for the 1:1 type. As for the 1+1 type, there is no need for APS protocol, since in the 1+1 protection, only the sink should switch the working traffic and there is no need for cooperation between the source and the sink.

Figure 4:
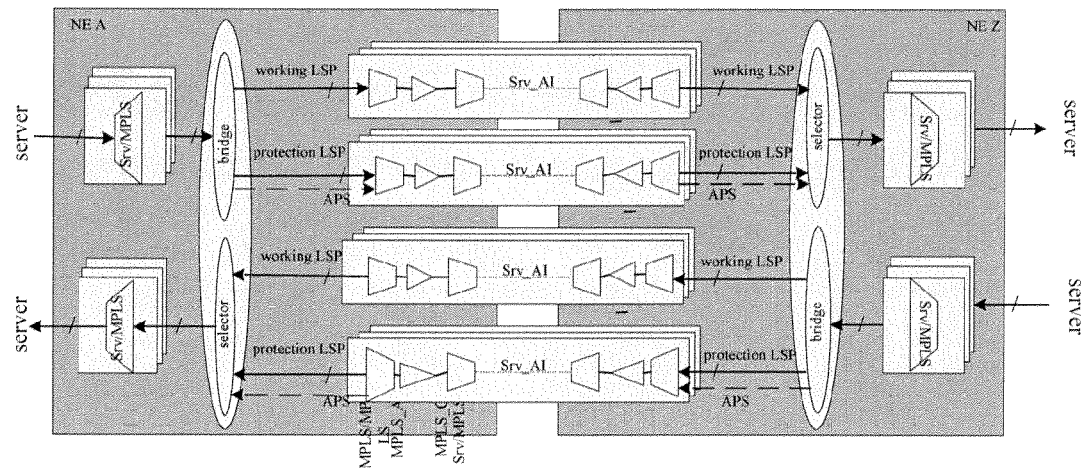
FIG. 4 is a schematic diagram illustrating the SNC/S group protection in accordance with a first embodiment of the present invention.
Figure 5:
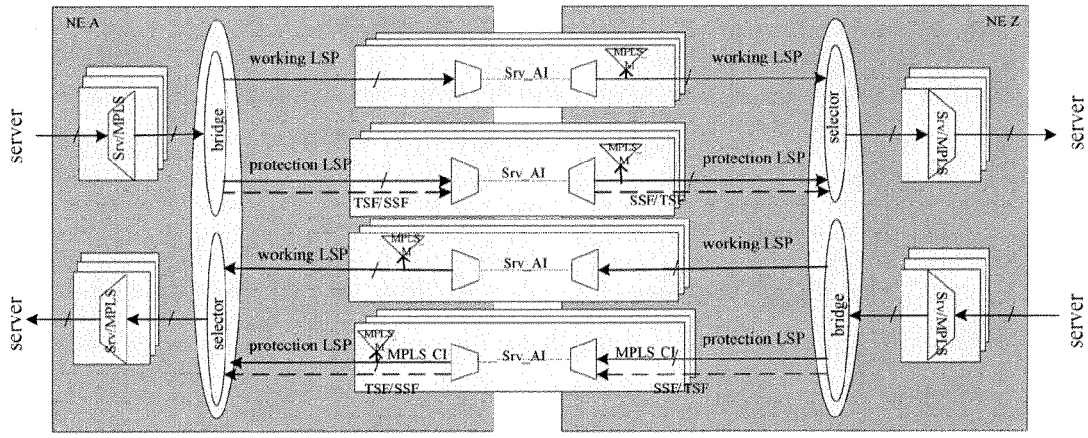
FIG. 5 is a schematic diagram illustrating the SNC/N group protection in accordance with a first embodiment of the present invention.

FIG. 4 shows a schematic diagram illustrating a model of SNC/S group protection in the 1+1 mode/1:1. FIG. 5 is a schematic diagram illustrating a model of SNC/N group protection in the 1+1 mode. Principles of SNC/N-based LSP group protection and SNC/S-based LSP group protection are similar to that of trail-based LSP group protection except that trails in the trail-based LSP group protection are end-to-end while the SNC in SNC/N LSP group and in SNC/S LSP group is a part of an LSP in an MPLS sub-network. Moreover, the SNC/N may preferably be used in the 1+1 protection rather than in the 1:1 protection.

That is, in this embodiment, there is no need for merging working LSPs or protection LSPs in one LSP respectively. Instead, each LSP should be monitored respectively and the protection switching operation should be carried out according to monitoring results of all the working and protection LSPs, that is, when an SD/SF is detected on an LSP of the working LSP group and no SD/SF is detected on an LSP of the protection LSP group, a protection switching operation is triggered.

In a second embodiment of the present invention, an LSP group protection in an MPLS sub-network is implemented using the SNC/T. This embodiment differs from the first embodiment in that the monitoring mode is different.

Figure 6:
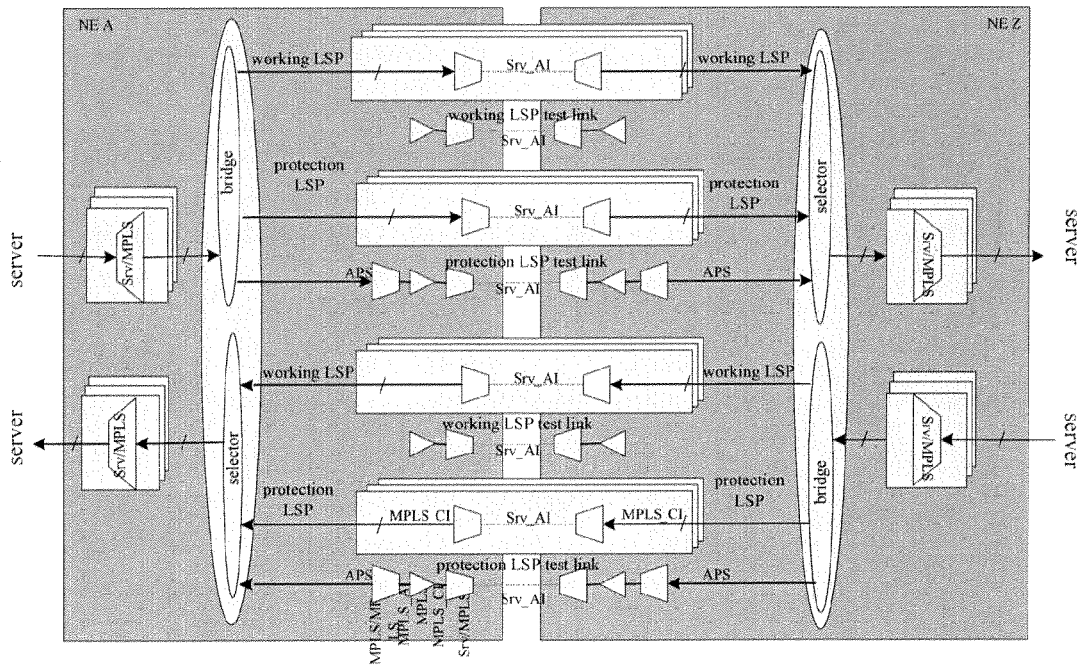
FIG. 6 is a schematic diagram illustrating the SNC/T group protection in accordance with a second embodiment of the present invention.

An implementation scheme of this embodiment is shown in FIG. 6. In FIG. 6, a working LSP group and a protection LSP group may be monitored via a test dedicated LSP respectively. In order to ensure that monitoring results can reflect states of a working LSP group and a protection LSP group exactly, i.e., whether a failure is detected and whether the failure is removed, the test LSP, the working LSP group and the protection LSP group may have the same attributes,

TABLE 1

| 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| Request/State | | | | | | | | Protection type A B D R | | | | | | | | Requested Signal | | | | | | | | Bridged Signal | | | | | | | | Reserved | | | | | | | | including identical bandwidths, identical sources and identical sinks. The states of the whole working LSP group and the protection LSP group may be obtained by detecting the dedicated test LSPs in the working LSP group/protection LSP group respectively and the protection switching operation may be carried out according to the states of the working LSP group and the protection LSP group.

In order to detect the dedicated test LSP, the source of the test dedicated LSP inserts and sends a detection packet to the test dedicated LSP periodically and the sink detects the detection packet periodically.

Note that the APS message may be transmitted on the test dedicated LSP of the protection LSP group.

Also note that when the SNC/T protection is in a 1+1 mode, the APS protocol is not needed, since in the 1+1 protection, only the sink should switch the working traffic and there is no need for cooperation between the source and the sink.

Figure 7:
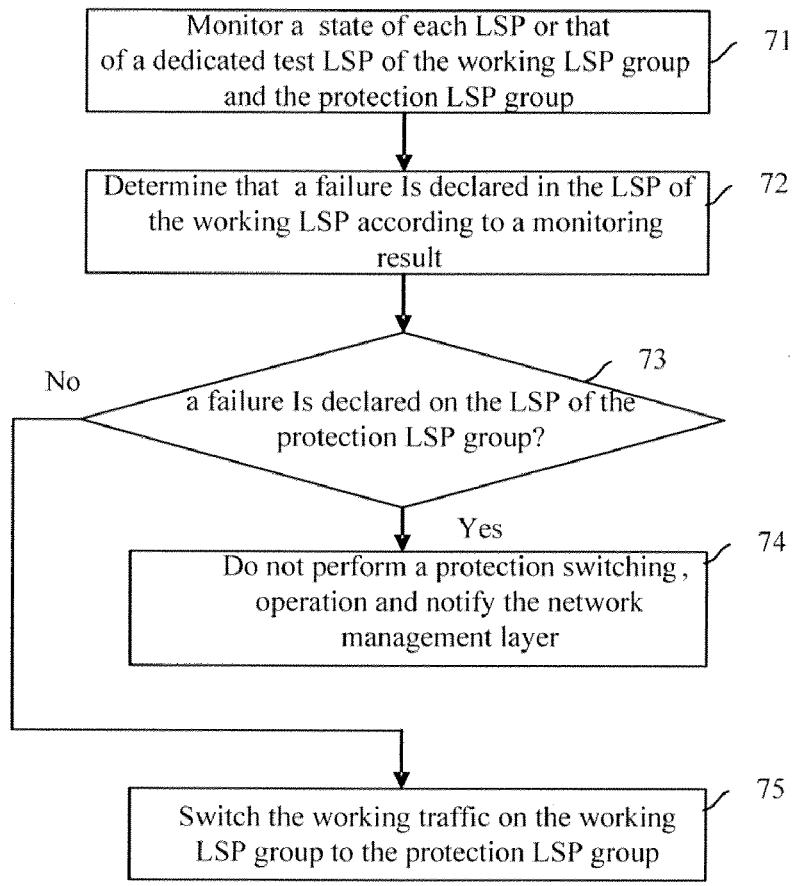
FIG. 7 is a flowchart illustrating a process of implementing a group protection according to an embodiment of the present invention.

According to embodiments of the present invention, an example method for implementing group protection in the MPLS network is shown in FIG. 7, and includes the following steps.

Step 71: Monitor the states of each LSP or test dedicated LSP in the working LSP group and the protection LSP group, i.e., monitor whether an SD/SF is detected on any LSP or dedicated LSP in the working LSP group and the protection LSP group.

Step 72: Determine that a failure is detected on an LSP of the working LSP group, according to monitoring results, that is, an SD/SF is detected.

Step 73: Determine whether a failure (e.g. an SD/SF) is detected on an LSP of the protection LSP group according to monitoring results. If a failure is detected on an LSP of the protection LSP group, Step 74 may be performed; otherwise, Step 75 may be performed.

Step 74: As the protection LSP group can not work normally because of the failure, a protection switching operation will not be carried out, and a notification should be sent to the network management layer.

Step 75: Switch the working traffic on the working LSP group to the protection LSP group where no failure is detected, thereby protecting information interaction in an MPLS network from being interrupted and effectively protecting the MPLS network.

Note that, in the first embodiment, when an SF/SD is detected on any one of the LSPs the working LSP group and no SF/SD is detected on any one of the LSPs of the protection LSP group, a protection switching operation may be performed. Those skilled in the art also should understand that when SFs/SDs are detected on a number of LSPs of the working LSP group and no SF/SD is detected on at least a number of LSPs of the protection LSP group, a protection switching operation may be performed. For example, when a failure is detected on the LSP with path number M of the working LSP group and no failure is detected on at least one LSP of the protection LSP group, the working traffic on the LSP with path number M is switched to the LSP without failure of the protection LSP group.

In accordance with preferred embodiments of the present invention, when a failure is detected, a protection switching operation may be performed on one specified path or on multiple specified paths to make the LSP group protection in the MPLS network more flexible and convenient. In this case, group protection related parameters, such as group numbers of the working LSP group and the protection LSP group, and path numbers, may be configured. For example, the working traffic on the LSP with path number Y of the working LSP group with group number X may be switched to the protection LSP group.

Figure 8:
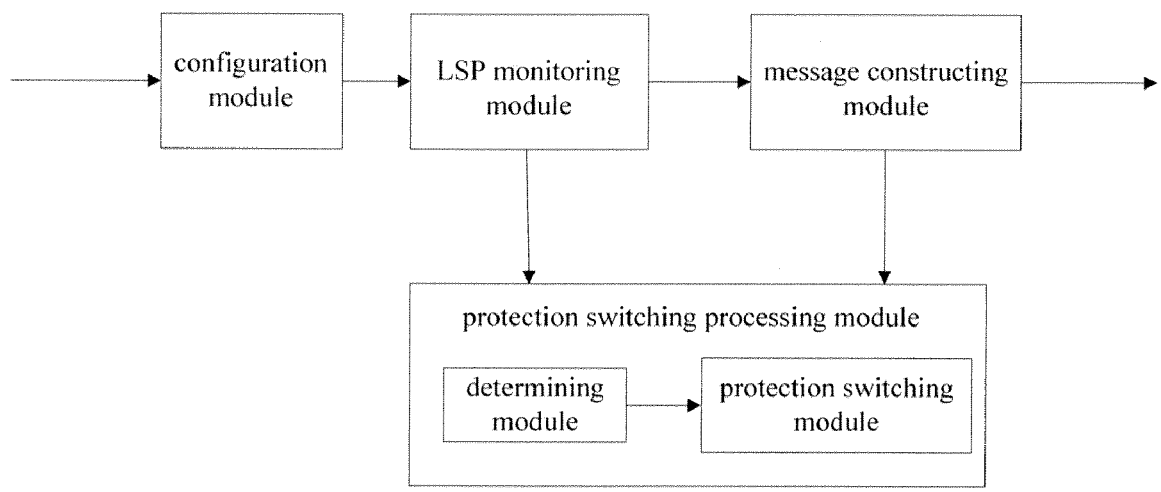
FIG. 8 is a schematic diagram illustrating the structure of a device for implementing a group protection in accordance with a third embodiment of the present invention.

FIG. 8 is a device for implementing group protection in an MPLS network in accordance with a third embodiment of the present invention. As shown in FIG. 8, the device includes:

an LSP monitoring module to monitor each LSP in a working LSP group and a protection LSP group in an MPLS network respectively;

a protection switching module to carry out a protection switching operation according to monitoring results of the LSP monitoring module, specifically, to carry out a corresponding protection switching operation when a failure is detected on any one of the LSPs of the working LSP group.

The protection switching module may perform the switching operation according to the state of the protection LSP group in the protection switching procedure, that is, just when no failure is detected in the protection LSP group, the working traffic on the working LSP group with a failure may be switch to the protection LSP group to ensure normal information interaction after protection switching.

Therefore, the protection switching module may include:

a determining module to determine whether a failure is detected on an LSP of the protection LSP group, and trigger a protection switching processing module when a failure is detected; and the protection switching processing module to switch working traffic on the working LSP group with a failure to the protection LSP group.

The device for implementing group protection in an MPLS network in accordance with a third embodiment of the present invention may also include a configuration module to configure LSP group protection related parameters at a source and at a sink of LSP group protection, such as group number information and priority information of protection switching; and a message constructing module to carry the group number information identifying different LSP groups in a Requested Signal message or in a Bridged Signal message. Corresponding monitoring and protection switching operation may be realized by transferring the corresponding message in the MPLS network.

Specifically, the LSP monitoring module may be implemented based on the Group Trail technique, the SNC/S technique, the SNC/N technique or the SNC/T technique.

Figure 9:
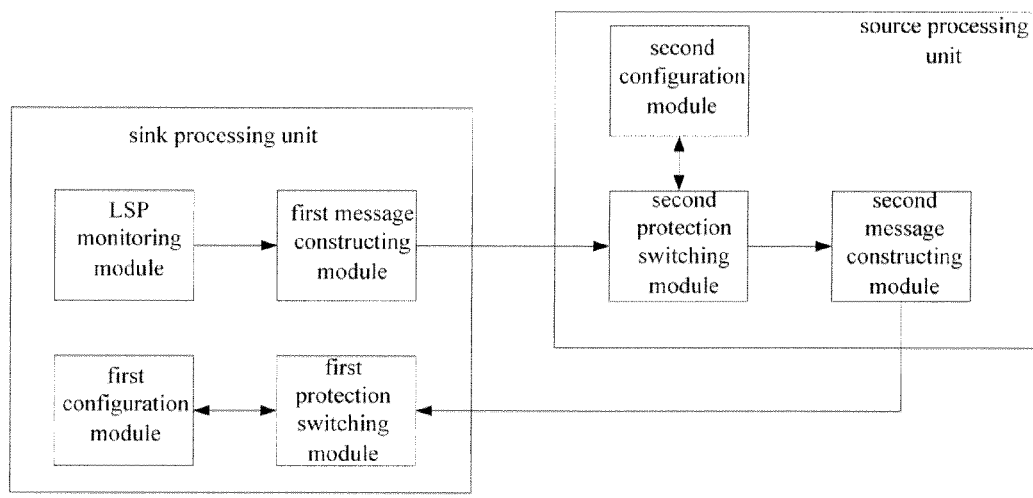
FIG. 9 is a schematic diagram illustrating the structure of a device for implementing a group protection in accordance with a fourth embodiment of the present invention.

FIG. 9 is a schematic diagram illustrating the structure of a device for implement group protection in an MPLS network in accordance with a fourth embodiment of the present invention. In this embodiment, cooperation between the sink and the source is needed to implement the group protection, and the device in this embodiment is preferably used in the 1:1 protection. As shown in FIG. 9, the device of this embodiment may include a sink processing unit and a source processing unit.

The sink processing unit may include:

a first configuration module to configure LSP group protection related parameters at the sink of the LSP group protection, such as group number information, priority information of protection switching and so on;

an LSP monitoring module to monitor each LSP or test dedicated LSP of a working LSP group and a protection LSP group in an MPLS network, send a triggering signal to trigger protection switching when a failure is detected in the working LSP group while the protection LSP group is normal; wherein according to different implementation modes. The LSP monitoring module may be a group trail protection based monitoring module, an SNC/S-based group protection monitoring module, a SNC/N-based group protection monitoring module or a SNC/T-based group protection monitoring module;

a first message constructing module to construct a first APS message containing a group number of the LSP group with a failure after receiving the triggering signal of protection switching from the LSP monitoring module, and send the first APS message to the source processing unit via the protection LSP group to request the source processing unit to carry out a protection switching; and a first protection switching module to instruct, after receiving a second APS message returned by the source processing unit, a selector of the sink to receive working traffic from the protection LSP group according to the second APS message and the group protection related parameters in the first configuration module.

The source processing unit may include:

a second configuration module to configure LSP group protection related parameters at the source of LSP group protection, such as group number information, priority information of protection switching and so on;

a second protection switching module to instruct, after receiving the first APS message from the sink processing unit, a bridge of the source to switch the working traffic from the working LSP group with a failure to the protection LSP group according to the first APS message and the group protection related parameters in the second configuration module; and a second message constructing module to construct a second APS message containing protection switching results according to the switching results of the second protection switching module, and send the second APS message to the sink processing unit via the protection LSP group to notify the sink processing unit of the protection switching results.

Figure 10:
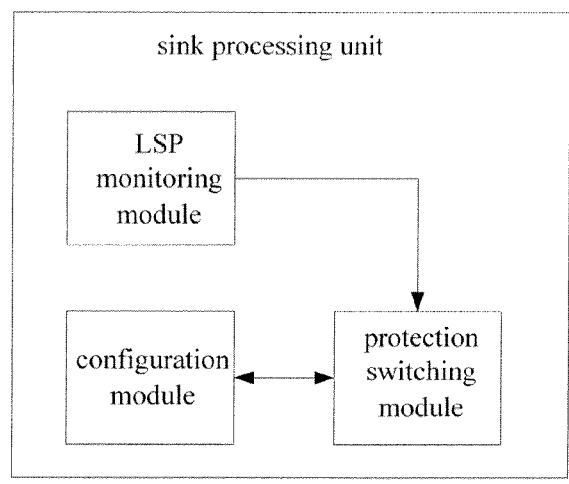
FIG. 10 is a schematic diagram illustrating the structure of a device for implementing a group protection in accordance with a fifth embodiment of the present invention.

FIG. 10 is a schematic diagram illustrating the structure of a device for implementing group protection in an MPLS network in accordance with a fifth embodiment of the present invention. In this embodiment, cooperation between the sink and the source is not needed to implement the group protection, and the device in this embodiment is preferably used in the 1+1 protection. As shown in FIG. 10, the device of this embodiment may include these sink processing modules:

a configuration module to configure LSP group protection related parameters, such as group number information, priority information of protection switching, etc, at the sink of the LSP group protection;

an LSP monitoring module to monitor each LSP or test dedicated LSP of a working LSP group and a protection LSP group in an MPLS network, send a triggering signal to trigger protection switching when a failure is detected in the working LSP group while the protection LSP group is normal; and a protection switching module to instruct, after receiving the triggering signal of protection switching, a selector of the sink to receive the working traffic from the protection LSP group according to the group protection related parameters in the configuration module.

As above, in accordance with embodiments of the present invention, LSP groups are not needed merged, and the state of each LSP in an LSP group is monitored. When an SF/SD is detected on any one of the working LSPs while no SF/SD is detected on the protection LSPs, LSP group protection switching may be triggered to implement the protection of the working traffic, thereby effectively reducing the complacency of implementation of the LSP group protection.

In addition, the LSP group protection based on the SNC/T provided in the embodiments of the present invention is applicable to the case that additional LSPs with the same attributes as that of LSPs in the protection domain exist in the MPLS network, wherein the additional LSPs, rather than the LSP group in the protection domain, may function as dedicated test LSPs to monitor the LSPs, and an LSP group protection operation may be triggered according to states of the additional LSPs. By introducing the SNC/T, more schemes are offered for implementing the LSP group protection in the MPLS sub-network.

The foregoing are only preferred embodiments of this invention and are not intended to limit this invention. The invention is to cover all the modifications, variations and equivalent replacements within the spirit and scope of the disclosure as defined by the appended claims.

What is claimed is:

1. A method for implementing a group protection in a MultiProtocol Label Switching (MPLS) network, comprising:

configuring group protection parameters comprising a group number of a working Label Switched Path (LSP) group and a group number of a protection LSP group corresponding to the working LSP group at a sink of the working LSP group in an MPLS network;

monitoring, by the sink of the working LSP group, an LSP in the working LSP group and an LSP in the protection LSP group; and receiving, by the sink of the working LSP group, working traffic on the protection LSP group according to the group protection parameters upon detecting a failure on the monitored LSP of the working LSP group.

2. A method according to claim 1, wherein said monitoring the LSP in the working LSP group and the LSP in the protection LSP group comprises:

monitoring each LSP of the working LSP group and each LSP of the protection LSP group in the MPLS network.

3. A method according to claim 2, further comprising:

switching working traffic on the working LSP group to the protection LSP group upon detecting no failure in the protection LSP group; and switching working traffic on the LSP with a failure of the working LSP group or on the specified LSP with a failure to the LSP without a failure of the protection LSP group upon detecting a failure on partial LSPs of the protection LSP group.

4. A method according to claim 3, wherein said monitoring each LSP of the working LSP group and each LSP of the protection LSP group in the MPLS network comprises:

monitoring the LSP at a Terminal Connection Point (TCP) of each LSP of the working LSP group and at a TCP of each LSP of the protection LSP group for a trail-based LSP group protection.

5. A method according to claim 3, wherein said monitoring each LSP of a working LSP group and each LSP of a protection LSP group in the MPLS network comprises:

monitoring each LSP at a Terminal Connection Point (TCP) of each LSP SubNetwork Connection of the working LSP group and at a TCP of each LSP SubNetwork Connection of the protection LSP group for a SubNetwork Connection Protection with Sublayer monitoring or for a Non-intrusively monitored SubNetwork Connection Protection.

6. A method according to claim 2, wherein said monitoring each LSP of the working LSP group and each LSP of the protection LSP group in the MPLS network comprises:

monitoring the LSP at a Terminal Connection Point (TCP) of each LSP of the working LSP group and at a TCP of each LSP of the protection LSP group for a trail-based LSP group protection.

7. A method according to claim 2, wherein said monitoring each LSP of the working LSP group and each LSP of the protection LSP group in the MPLS network comprises:
monitoring each LSP at a Terminal Connection Point (TCP) of each LSP SubNetwork Connection of the working LSP group and at a TCP of each LSP SubNetwork Connection of the protection LSP group for a SubNetwork Connection Protection with Sublayer monitoring or for a Non-intrusively monitored SubNetwork Connection Protection.

8. A method according to claim 1, wherein said monitoring the LSP in the working LSP group and the LSP in the protection LSP group comprises:
monitoring, a SubNetwork Connection Protection configured with Test trail monitoring, each test dedicated LSP in the working LSP group along with the same LSP information as that of the working LSP group; and
monitoring each test dedicated LSP in the protection LSP group along with the same LSP information as that of the protection LSP group in the MPLS network.

9. A method according to claim 8, wherein the LSP information comprises a bandwidth occupied by the LSP, a source of the LSP and a sink of the LSP.

10. A method according to claim 8, further comprising:
sending, by the sink of the working LSP group, a first APS message comprising the group number of the LSP group with a failure to a source of the working LSP group via the protection LSP group upon detecting a failure on the LSP of the working LSP group;
switching by the source of the working LSP group, working traffic on the LSP group with a failure to the protection LSP group according to the group protection parameters, and returning a second APS message to the sink via the protection LSP group.

11. A method according to claim 10, wherein the protection parameters further comprise a priority level of the LSP group protection; and
the method further comprises:
configuring a priority of the LSP group protection as higher than that of an individual LSP protection; and
performing the LSP group protection switching when triggering a protection switching.

12. A method according to claim 1, wherein the failure on the LSP comprises one of a Signal Degrade (SD) and a Signal Fail (SF).

13. A method according to claim 3, wherein said switching working traffic on the working LSP group to the protection LSP group upon detecting no failure in the protection LSP group comprises:
sending, by the sink of the working LSP group, a first Automatic Protection Switching (APS) message comprising the group number of the LSP group with a failure to a source of the working LSP group via the protection LSP group upon detecting a failure on the LSP of the working LSP group;
switching, by the source of the working LSP group, working traffic on the LSP group with a failure to the protection LSP group according to the group protection parameters, and returning a second APS message to the sink via the protection LSP group.

14. A method according to claim 13, wherein the protection parameters further comprise a priority level of the LSP group protection; and
the method further comprises:
configuring a priority of the LSP group protection as higher than that of an individual LSP protection; and
performing the LSP group protection switching when triggering a protection switching.

15. A device for implementing group protection in an MPLS network, comprising:
a configuration module, for configuring LSP group protection parameter information at a sink of a working LSP group in an MPLS network;
an LSP monitoring module, for monitoring an LSP in the working LSP group and an LSP in a protection LSP group in the MPLS network; and
a protection switching module, for performing a protection switching according a monitoring result of the LSP monitoring module upon detecting a failure on the LSP of the working LSP group.

16. A device according to claim 15, wherein the LSP monitoring module comprises one of a Group Trail-based LSP monitoring module, a SubNetwork Connection Protection with a Sublayer monitoring-based LSP monitoring module, a Non-intrusively monitored SubNetwork Connection Protection-based LSP monitoring module and a SubNetwork Connection Protection with Test trail monitoring-based LSP monitoring module.

17. A device according to claim 16, further comprising:
a message constructing module, for carrying group number information identifying the LSP group in a Requested Signal message or in a Bridged Signal message.

18. A device according to claim 15, wherein the protection switching module comprises:
a determining module, for determining whether a failure is detected on an LSP of the protection LSP group, and trigger a protection switching processing module upon detecting a failure; and
the protection switching processing module, for switching working traffic on the working LSP group with a failure to the protection LSP group.

19. A device according to claim 18, further comprising:
a message constructing module, for carrying group number information identifying the LSP group in a Requested Signal message or in a Bridged Signal message.

20. A device according to claim 15, further comprising:
a message constructing module, for carrying group number information identifying different LSP groups in a Requested Signal message or in a Bridged Signal message.

21. A device for implementing group protection in an MPLS network, comprising:
a sink processing unit and a source processing unit; wherein
the sink processing unit comprises:
an LSP monitoring module, for monitoring each LSP or a test dedicated LSP of a working LSP group and monitoring each LSP or a test dedicated LSP of a protection LSP group in an MPLS network, and triggering a protection switching when a failure is detected in the working LSP group;
a first message constructing module, for constructing a first Automatic Protection Switching (APS) message containing a group number of the LSP group with a failure after the protection switching is triggered, and sending the first APS message to the source processing unit via the protection LSP group to request the source processing unit to perform the protection switching; and
a first protection switching module, for instructing a selector of the sink to receive working traffic from the protection LSP group upon receiving a second APS message returned by the source processing unit; and
the source processing unit comprises:

a second protection switching module, for instructing a bridge of the source to switch the working traffic on the working LSP group with a failure to the protection LSP group after receiving the first APS message from the sink processing unit; and a second message constructing module, for constructing the second APS message containing a protection switching result according to the protection switching result of the second protection switching module, and sending the second APS message to the sink processing unit via the protection LSP group to notify the sink processing unit of the protection switching result.

22. A device according to claim 21, further comprising:

a first configuration module in the sink processing unit, for storing LSP group protection parameters containing a group number of the working LSP group and a group number of the protection LSP group corresponding to the working LSP group; and a second configuration module in the source processing unit, for storing LSP group protection parameters containing a group number of the working LSP group and a group number of the protection LSP group corresponding to the working LSP group; wherein the first protection switching module is used for instructing the selector of the sink to receive the working traffic from the protection LSP group according to the LSP group protection parameters; and the second protection switching module is used for instructing the bridge of the source to switch the working traffic to the protection LSP group according to the LSP group protection parameters.

23. A device according to claim 21, wherein the LSP monitoring module comprises one of a Group Trail-based LSP monitoring module, a SubNetwork Connection Protection with Sublayer monitoring-based LSP monitoring module, a Non-intrusively monitored SubNetwork Connection Protection-based LSP monitoring module and a SubNetwork Connection Protection with Test trail monitoring-based LSP monitoring module.

24. A device for implementing group protection in an MPLS network, comprising:

a sink processing unit comprising:

a configuration module, for storing LSP group protection parameters comprising a group number of a working LSP group and a group number of a protection LSP group corresponding to the working LSP group;

an LSP monitoring module, for monitoring each LSP or a test dedicated LSP of the working LSP group and monitoring each LSP or a test dedicated LSP of the protection LSP group in an MPLS network, and triggering a protection switching when a failure is detected in the working LSP group; and a protection switching module, for instructing a selector of a sink to receive the working traffic from the protection LSP group according to the LSP group protection parameters after the protection switching is triggered.

25. A device according to claim 24, wherein the LSP monitoring module comprises one of a Group Trail-based LSP monitoring module, a SubNetwork Connection Protection with Sublayer monitoring-based LSP monitoring module, a Non-intrusively monitored SubNetwork Connection Protection-based LSP monitoring module and a SubNetwork Connection Protection with Test trail monitoring-based LSP monitoring module.

* * * * *